United States Patent
Lorenzen et al.

(10) Patent No.: US 10,921,844 B2
(45) Date of Patent: Feb. 16, 2021

(54) ARBITRARY WAVEFORM SEQUENCER DEVICE AND METHOD

(71) Applicant: Rohde & Schwarz GmbH & Co. KG, Munich (DE)

(72) Inventors: Rolf Lorenzen, Taufkirchen (DE); Daniel Hank, Munich (DE)

(73) Assignee: ROHDE & SCHWARZ GMBH & CO. KG, Munich (DE)

(*) Notice: Subject to any disclaimer, the term of this patent is extended or adjusted under 35 U.S.C. 154(b) by 327 days.

(21) Appl. No.: 15/995,978

(22) Filed: Jun. 1, 2018

(65) Prior Publication Data
US 2019/0369655 A1 Dec. 5, 2019

(51) Int. Cl.
*G06F 1/03* (2006.01)

(52) U.S. Cl.
CPC .......... *G06F 1/0328* (2013.01); *G06F 1/0342* (2013.01)

(58) Field of Classification Search
CPC .................................................. G06F 1/0328
See application file for complete search history.

(56) References Cited

U.S. PATENT DOCUMENTS

| | | | |
|---|---|---|---|
| 6,393,449 B1 * | 5/2002 | Bair | G01R 33/3607 708/270 |
| 6,957,239 B2 * | 10/2005 | Conway | G06F 1/0321 708/272 |
| 7,385,543 B2 | 6/2008 | Jungerman | |
| 8,575,983 B1 | 11/2013 | Sakai | |
| 10,546,158 B2 * | 1/2020 | Kreusser | G06G 7/26 |

FOREIGN PATENT DOCUMENTS

| | | |
|---|---|---|
| EP | 2701032 A2 | 2/2014 |
| JP | 3880395 B2 | 2/2007 |

* cited by examiner

*Primary Examiner* — Manuel A Rivera Vargas
(74) *Attorney, Agent, or Firm* — Ditthavong & Steiner P.C.

(57) ABSTRACT

An arbitrary waveform sequencer device for playing a list of at least a first and a second arbitrary waveform file in a sequence is provided. The arbitrary waveform sequencer device comprises a list increment condition control unit configured to control an increment from the first to the second arbitrary waveform file as a function of an increment condition, and a transition control unit configured to control a timing of the increment.

16 Claims, 3 Drawing Sheets

ARBITRARY WAVEFORM SEQUENCER DEVICE AND METHOD

TECHNICAL FIELD

The invention relates to an arbitrary wave sequencer device and an arbitrary waveform sequencer method for playing a list of at least a first and a second arbitrary waveform file in a sequence.

BACKGROUND ART

Generally, in times of an increasing number of applications processing waveform signals, there is a growing need of an arbitrary waveform sequencer device and a corresponding method in order to verify correct functioning of said applications in a very flexible, and thus also cost-efficient, manner.

U.S. Pat. No. 8,575,983 B1 discloses a waveform generator having a waveform generation circuit storing waveform data for an analog waveform signal having dead time periods without the need for storing data on the dead time. Furthermore, a sequencer having a sequence memory stores sequence data that controls the sequencing of one or more signal components and associated dead times of the analog waveform signal. The timing of the dead time is controlled by a sampling clock and a wait time counter. The generation of the signal components is controlled by the sampling clock controlling the generation of addresses for a waveform memory storing digital data of the sampling components. The waveform memory digital data is converted to an analog waveform signal. As it can be seen, due to the described configuration with special respect to said dead time and said waveform memory, a high flexibility cannot be achieved.

Accordingly, there is a need to provide an arbitrary wave sequencer device and an arbitrary waveform sequencer method, whereby a high flexibility, and thus also cost-efficiency, are especially ensured.

SUMMARY OF THE INVENTION

According to a first aspect of the invention, an arbitrary waveform sequencer device for playing a list of at least a first and a second arbitrary waveform file in a sequence is provided. The arbitrary waveform sequencer device comprises a list increment condition control unit configured to control an increment from the first to the second arbitrary waveform file as a function of an increment condition, and a transition control unit configured to control a timing of the increment. Advantageously, in this manner, high flexibility, and thus also cost-efficiency, can be ensured.

According to a first preferred implementation form in addition to this, the increment condition comprises at least one of a predefined play time, a number of repeat cycles of the first and/or the second arbitrary waveform file, a play of the list until a predefined event is detected, an event in a signal received by the arbitrary waveform sequencer device, which triggers playing the respective subsequent arbitrary waveform file, especially the second arbitrary waveform file after the first arbitrary waveform file, or any combination thereof. Advantageously, the increment condition can be adapted in a flexible and efficient manner with respect to the respective use case.

According to a second preferred implementation form of the first aspect of the invention, the timing comprises at least one of an immediate transition from the first to the second arbitrary waveform file, a predefined marker trace signal comprising at least one timing marker, or any combination thereof. Advantageously, the timing can efficiently be adapted with respect to a specific use case.

According to a further preferred implementation form of the first aspect of the invention, a sampling rate of subsequent arbitrary waveform files, especially of the first and the second arbitrary waveform file, is different. Advantageously, a broad spectrum of testing possibilities can be provided.

According to a further preferred implementation form of the first aspect of the invention, the arbitrary waveform sequencer device further comprises a resembling unit configured to match the sampling rate of the subsequent arbitrary waveform files, especially of the first and the second arbitrary waveform file. Advantageously, testing accuracy can be increased.

According to a further preferred implementation form of the first aspect of the invention, at least one of the first and the second arbitrary waveform file comprises IQ data. Advantageously, complex signals can be provided.

According to a further preferred implementation form of the first aspect of the invention, the IQ data form messages of a communication standard. Advantageously, measurements can efficiently be performed with respect to a specific communication standard.

According to a further preferred implementation form of the first aspect of the invention, the IQ data model certain signal characteristics. Advantageously, especially in the context of complex signals, measurements with respect to specific signal characteristic can be performed.

According to a second aspect of the invention, an arbitrary waveform sequencer method for playing a list of at least a first and a second arbitrary waveform file in a sequence is provided. The arbitrary waveform sequencer method comprises the steps of controlling an increment from the first to the second arbitrary waveform file as a function of an increment condition, and controlling a timing of the increment. Advantageously, in this manner, high flexibility, and thus also cost-efficiency, can be ensured.

According to a first preferred implementation form of the second aspect of the invention, the increment condition comprises at least one of a predefined play time, a number of repeat cycles of the first and/or the second arbitrary waveform file, a play of the list until a predefined event is detected, an event in a signal received by the arbitrary waveform sequencer device, which triggers playing the respective subsequent arbitrary waveform file, especially the second arbitrary waveform file after the first arbitrary waveform file, or any combination thereof. Advantageously, the increment condition can be adapted in a flexible and efficient manner with respect to the respective use case.

According to a further preferred implementation form of the second aspect of the invention, the timing comprises at least one of an immediate transition from the first to the second arbitrary waveform file, a predefined marker trace signal comprising at least one timing marker, or any combination thereof. Advantageously, the timing can efficiently be adapted with respect to a specific use case.

According to a further preferred implementation form of the second aspect of the invention, a sampling rate of subsequent arbitrary waveform files, especially of the first and the second arbitrary waveform file, is different. Advantageously, a broad spectrum of testing possibilities can be provided.

According to a further preferred implementation form of the second aspect of the invention, the arbitrary waveform sequencer method further comprises the step of matching the sampling rate of the subsequent arbitrary waveform files, especially of the first and the second arbitrary waveform file. Advantageously, testing accuracy can be increased.

According to a further preferred implementation form of the second aspect of the invention, at least one of the first and the second arbitrary waveform file comprises IQ data. Advantageously, complex signals can be provided.

According to a further preferred implementation form of the second aspect of the invention, the IQ data form messages of a communication standard. Advantageously, measurements can efficiently be performed with respect to a specific communication standard.

According to a further preferred implementation form of the second aspect of the invention, the IQ data model certain signal characteristics. Advantageously, especially in the context of complex signals, measurements with respect to specific signal characteristic can be performed.

BRIEF DESCRIPTION OF THE DRAWINGS

Exemplary embodiments of the invention are now further explained with respect to the drawings by way of example only, and not for limitation. In the drawings.

DETAILED DESCRIPTION OF THE PREFERRED EMBODIMENTS

Figure 1:
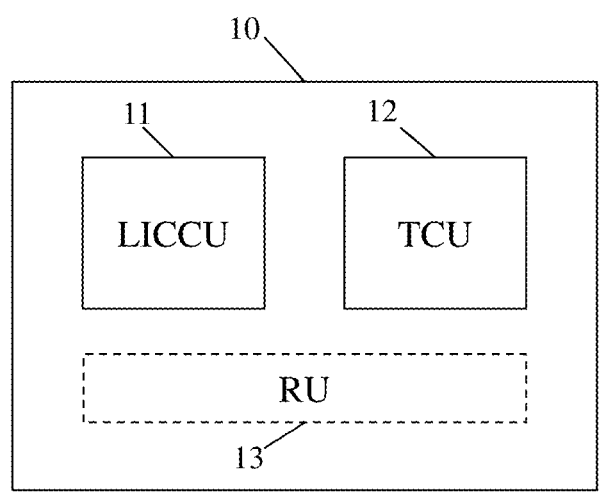
FIG. 1 shows an exemplary embodiment of the first aspect of the invention.

Firstly, FIG. 1 illustrates an exemplary embodiment of an inventive arbitrary waveform sequencer device 10 for playing a list of at least a first and a second arbitrary waveform file in a sequence for secure data handling. Said arbitrary waveform sequencer device 10 comprises a list increment condition control unit 11 and a transition control unit 12.

In this context, the list increment condition control unit 11 is configured to control an increment from the first to the second arbitrary waveform file as a function of an increment condition, whereas the transition control unit 12 is configured to control a timing of the increment.

With respect to the increment condition, it might be particularly advantageous if the latter comprises at least one of a predefined play time, a number of repeat cycles of the first and/or the second arbitrary waveform file, a play of the list until a predefined event is detected, an event in a signal received by the arbitrary waveform sequencer device, which triggers playing the respective subsequent arbitrary waveform file, especially the second arbitrary waveform file after the first arbitrary waveform file, or any combination thereof.

In addition to this, the timing may preferably comprise at least one of an immediate transition from the first to the second arbitrary waveform file, a predefined marker trace signal comprising at least one timing marker, or any combination thereof.

Moreover, a sampling rate of subsequent arbitrary waveform files, especially of the first and the second arbitrary waveform file, may be different.

In this context, it might be further advantageous if the arbitrary waveform sequencer device optionally comprises a resembling unit 13 configured to match the sampling rate of the subsequent arbitrary waveform files, especially of the first and the second arbitrary waveform file.

Furthermore, it is noted that at least one of the first and the second arbitrary waveform file may preferably comprise IQ data.

Additionally or alternatively, the IQ data may preferably form messages of a communication standard.

In further addition to this or as a further alternative, the IQ data may preferably model certain signal characteristics.

Figure 2:
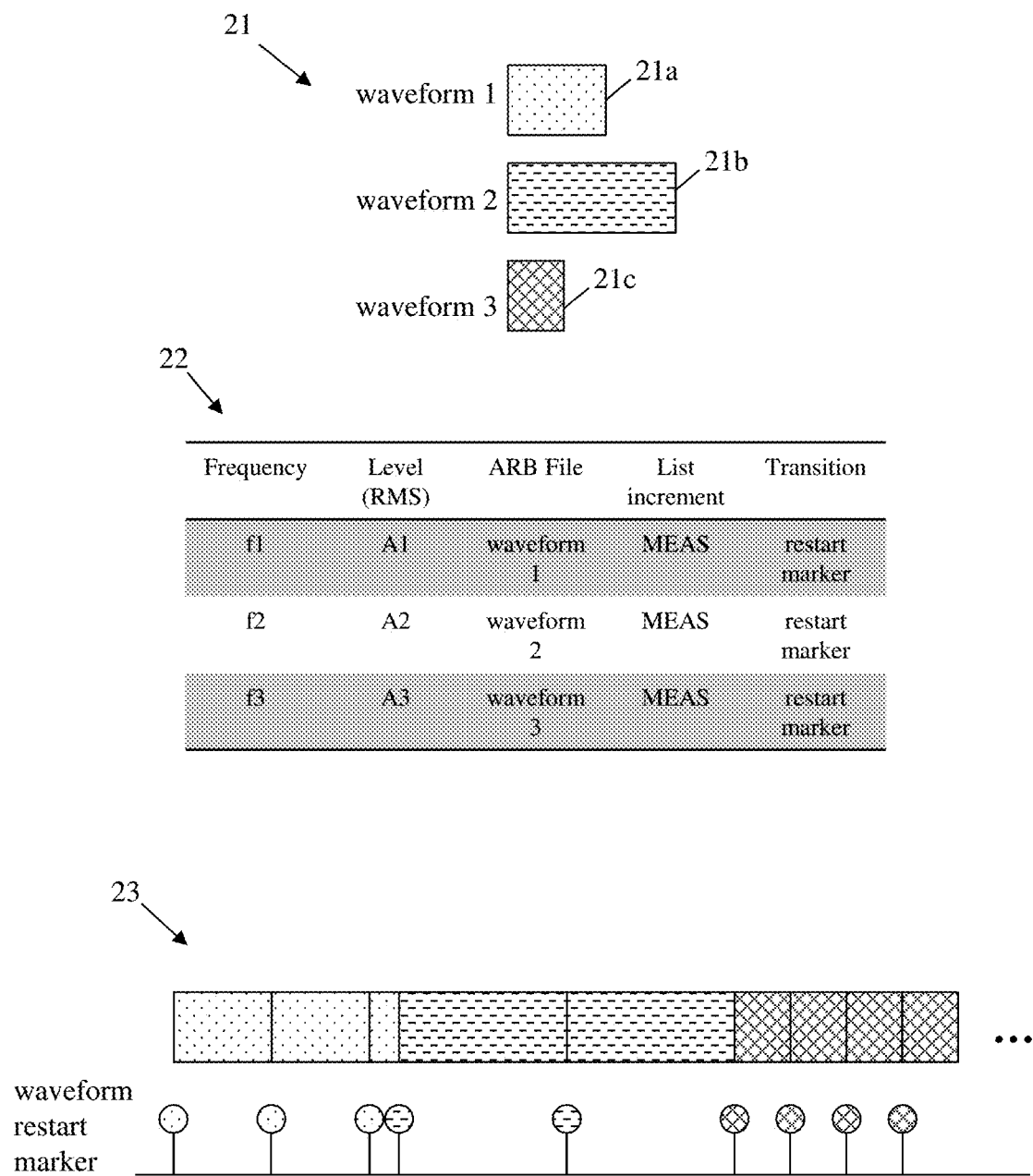
FIG. 2 shows an exemplary scenario of playing a list of arbitrary waveform files in a sequence according to the invention.

Now, with respect to FIG. 2, an exemplary scenario of playing a list of arbitrary waveform files in a sequence with the aid of an inventive arbitrary waveform sequencer device is illustrated.

According to FIG. 2, there is a number of arbitrary waveform files (ARB files) 21, exemplarily three ARB files. In this context, a first ARB file comprises a first waveform 21a, also called "waveform 1", a second ARB file comprises a second waveform 21b, also called "waveform 2", and a third ARB file comprises a third waveform 21c, also called "waveform 3".

In addition to this, in accordance with table 22 of FIG. 2, the first waveform 21a comprises a first frequency f1 and a Root Mean Square (RMS) level of A1, whereas the second waveform 21b comprises a second frequency f2 and a RMS level of A2. Analogously, the third waveform 21c comprises a third frequency f3 and a RMS level of A3.

As it can further be seen according to table 22, the to respective list increment is exemplarily triggered with the aid of a certain measurement event with respect to each of the ARB files, whereas the corresponding transition (or timing, respectively) exemplarily comprises a restart maker especially in each case.

Moreover, FIG. 2 also depicts an exemplary sequence 23 composed of said three ARB files, wherein the respective waveform restart markers are additionally visualized.

With respect to the waveform restart markers, it should be mentioned that a marker may especially be set to the slot limit of the respective waveform but in general, the position of a marker is freely selectable by the user. In addition to this, it is noted that a marker may especially occur in a respective receive signal in an asynchronous manner. In this context, additionally or alternatively, the subsequent ARB file is played, depending on the chosen time of increment.

Figure 3:
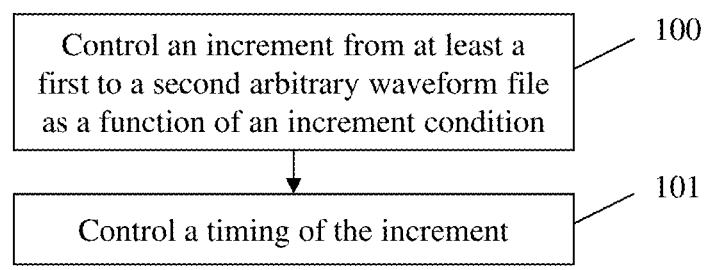
FIG. 3 shows a flow chart of an exemplary embodiment of the second aspect of the invention.

Finally, FIG. 3 shows a flow chart of an exemplary embodiment of the inventive arbitrary waveform sequencer method for playing a list of at least a first and a second arbitrary waveform file in a sequence. In a first step 100, an increment from the first to the second arbitrary waveform file is controlled as a function of an increment condition. Then, in a second step 101, a timing of the increment is controlled.

In addition to this, the increment condition may comprise at least one of a predefined play time, a number of repeat cycles of the first and/or the second arbitrary waveform file, a play of the list until a predefined event is detected, an event in a signal received by the arbitrary waveform sequencer device, which triggers playing the respective subsequent arbitrary waveform file, especially the second arbitrary waveform file after the first arbitrary waveform file, or any combination thereof.

It might be further advantageous if the timing comprises at least one of an immediate transition from the first to the second arbitrary waveform file, a predefined marker trace signal comprising at least one timing marker, or any combination thereof.

Furthermore, a sampling rate of subsequent arbitrary waveform files, especially of the first and the second arbitrary waveform file, may preferably be different.

Moreover, the arbitrary waveform sequencer method may further comprise the step of matching the sampling rate of the subsequent arbitrary waveform files, especially of the first and the second arbitrary waveform file.

Additionally, at least one of the first and the second arbitrary waveform file may preferably comprise IQ data.

In this context, it might be particularly advantageous if the IQ data form messages of a communication standard.

In addition to this or as an alternative, the IQ data may preferably model certain signal characteristics.

While various embodiments of the present invention have been described above, it should be understood that they have been presented by way of example only, and not limitation. Numerous changes to the disclosed embodiments can be made in accordance with the disclosure herein without departing from the spirit or scope of the invention. For example, a current may be generated instead of a voltage. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. An arbitrary waveform sequencer device for playing a list of at least a first and a second arbitrary waveform file in a sequence, the arbitrary waveform sequencer device comprising:
   a list increment condition control unit configured to control playing of the first arbitrary waveform file and subsequently playing the second arbitrary waveform file as a function of an increment condition, and
   a transition control unit configured to control a timing of the playing of the first arbitrary waveform file and subsequently playing the second arbitrary waveform.

2. The arbitrary wave sequencer device according to claim 1,
   wherein the increment condition comprises at least one of a predefined play time, a number of repeat cycles of the first and/or the second arbitrary waveform file, a play of the list until a predefined event is detected, an event in a signal received by the arbitrary waveform sequencer device, which triggers playing the second arbitrary waveform file after the first arbitrary waveform file, or any combination thereof.

3. The arbitrary waveform sequencer device according to claim 1,
   wherein the timing comprises at least one of an immediate transition from the first to the second arbitrary waveform file, a predefined marker trace signal comprising at least one timing marker, or any combination thereof.

4. The arbitrary waveform sequencer device according to claim 1,
   wherein a sampling rate of the first and the second arbitrary waveform file is different.

5. The arbitrary waveform sequencer device according to claim 4,
   wherein the arbitrary waveform sequencer device further comprises a resampling unit configured to match the sampling rate of the first and the second arbitrary waveform file.

6. The arbitrary waveform sequencer device according to claim 1,
   wherein at least one of the first and the second arbitrary waveform file comprises intelligence quotient (IQ) data.

7. The arbitrary waveform sequencer device according to claim 6,
   wherein the IQ data form messages of a communication standard.

8. The arbitrary waveform sequencer device according to claim 6,
   wherein the IQ data model signal characteristics.

9. An arbitrary waveform sequencer method for playing a list of at least a first and a second arbitrary waveform file in a sequence, the arbitrary waveform sequencer method comprising the steps of:
   controlling playing, by way of a list increment condition control unit of an arbitrary waveform sequencer, of the first arbitrary waveform file and subsequently playing the second arbitrary waveform file as a function of an increment condition, and
   controlling, by way of a transition control unit of the arbitrary waveform sequencer, a timing of the playing of the first arbitrary waveform file and subsequently playing the second arbitrary waveform.

10. The arbitrary wave sequencer method according to claim 9,
    wherein the increment condition comprises at least one of a predefined play time, a number of repeat cycles of the first and/or the second arbitrary waveform file, a play of the list until a predefined event is detected, an event in a signal received by the arbitrary waveform sequencer device, which triggers playing the second arbitrary waveform file after the first arbitrary waveform file, or any combination thereof.

11. The arbitrary waveform sequencer method according to claim 9,
    wherein the timing comprises at least one of an immediate transition from the first to the second arbitrary waveform file, a predefined marker trace signal comprising at least one timing marker, or any combination thereof.

12. The arbitrary waveform sequencer method according to claim 9,
    wherein a sampling rate of the first and the second arbitrary waveform file is different.

13. The arbitrary waveform sequencer method according to claim 12,
    wherein the arbitrary waveform sequencer method further comprises the step of matching the sampling rate of the first and the second arbitrary waveform file.

14. The arbitrary waveform sequencer method according to claim 9,
    wherein at least one of the first and the second arbitrary waveform file comprises intelligence quotient (IQ) data.

15. The arbitrary waveform sequencer method according to claim 14,
    wherein the IQ data form messages of a communication standard.

16. The arbitrary waveform sequencer method according to claim 14, wherein the IQ data model signal characteristics.

* * * * *